United States Patent [19]

O'Farrell

[11] 3,816,829

[45] June 11, 1974

[54] PSEUDONOISE ECHO RANGING SYSTEM WITH IMPROVED RANGE RESOLUTION WITHOUT INCREASE OF TRANSMITTED CODE WORD REPETITION FREQUENCY

[75] Inventor: Francis J. O'Farrell, Valencia, Calif.

[73] Assignee: International Telephone and Telegraph Corporation, New York, N.Y.

[22] Filed: Dec. 6, 1971

[21] Appl. No.: 205,087

[52] U.S. Cl. ............... 343/17.2, 343/13 R, 343/180

[51] Int. Cl. ........................... G01s 7/28, G01s 9/12

[58] Field of Search........ 343/17.2, 13 R, 17.1, 180; 325/21, 323

[56] References Cited

UNITED STATES PATENTS

| | | | |
|---|---|---|---|
| 3,183,506 | 5/1965 | Webb | 343/17.2 R |
| 3,396,392 | 8/1968 | Fishbein et al. | 343/17.2 R |
| 3,447,155 | 5/1969 | Webb | 343/13 R |
| 3,487,409 | 12/1969 | Thiele et al. | 343/17.2 R |

*Primary Examiner*—Richard A. Farley
*Assistant Examiner*—H. A. Birmiel
*Attorney, Agent, or Firm*—C. Cornell Remsen, Jr.

[57] ABSTRACT

An echo ranging system comprising a code generator, the output of the code generator is used to bi-phase modulate a carrier frequency signal. The modulated signal is then transmitted towards a target from a system antenna. A return echo signal is delayed with respect to the transmitted signal by the effective target range. Further, the output of the code generator is delayed so as to be phase aligned with the transmitter leakage or spillover signal at a mixer. The code on the leakage signal is then removed and the carrier is attenuated in a notch filter. The coded echo signal is not reconstituted since it is not in time synchronization and is coded a second time at the mixer. With a round trip range equivalent to a half word code period, the doubly coded echo will appear as if it were generated by an oscillator at twice the frequency. The twice frequency coded echo signal then passes through the notch filter virtually uneffected and is coupled to a second receiver demodulator. The second input to the demodulator is the code originally generated but at a frequency twice that of the original coder clock frequency. The higher frequency coded echo is then demodulated.

5 Claims, 2 Drawing Figures

PATENTED JUN 11 1974 3,816,829

PSEUDONOISE ECHO RANGING SYSTEM WITH IMPROVED RANGE RESOLUTION WITHOUT INCREASE OF TRANSMITTED CODE WORD REPETITION FREQUENCY

The invention relates to echo ranging systems and, more particularly, to a ranging system utilizing compressed codes to gain higher resolution.

BACKGROUND OF THE INVENTION

In conventional echo ranging systems which utilize pseudonoise techniques, the echo ranging is accomplished by correlating a delayed portion of the code transmitted waveform with the returned echo signal. When the returned coded echo signal is exactly bit aligned with the delayed reference coded waveform, the system may be considered to be correlated.

The range resolution of the system is given by the formula $c/2f$ where:

$c$ is the velocity of propagation of light, and $f$ is the code clock frequency.

A relative shortcoming of conventional echo ranging systems is that to achieve greater range resolution, the frequency of the code generator must be increased. To increase the frequency a substantial amount results in problems occurring which outweigh the increased resolution obtained. Typical problems resulting from increased frequency are that high frequency components used in the system result in greater noise due to cross-modulation mismatch. Further, the higher frequency components result in greater power dissipation.

In order to overcome the attendant disadvantages of prior art echo ranging systems, the present invention utilizes the round trip delay from the transmitter to the target to the receiver in order to obtain code compression of the echo signal. Such a system obviates the need for increasing the frequency of the system generator in order to obtain greater range resolution.

The advantages of the invention, both as to its construction and mode of operation, will be readily appreciated as the same becomes better understood by reference to the following detailed description when considered in connection with the accompanying drawings in which like referenced numerals designate like parts throughout the figures.

DESCRIPTION OF THE PREFERRED EMBODIMENT

Figure 1:
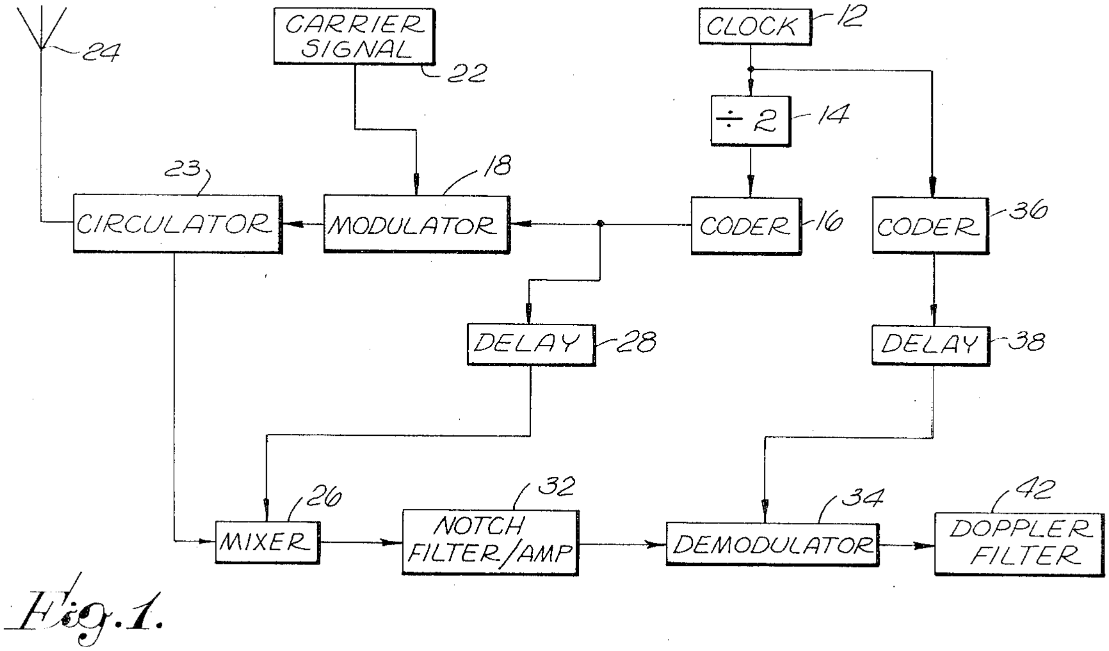
FIG. 1 depicts a block diagram of the echo ranging system in accordance with the invention.
Figure 2:
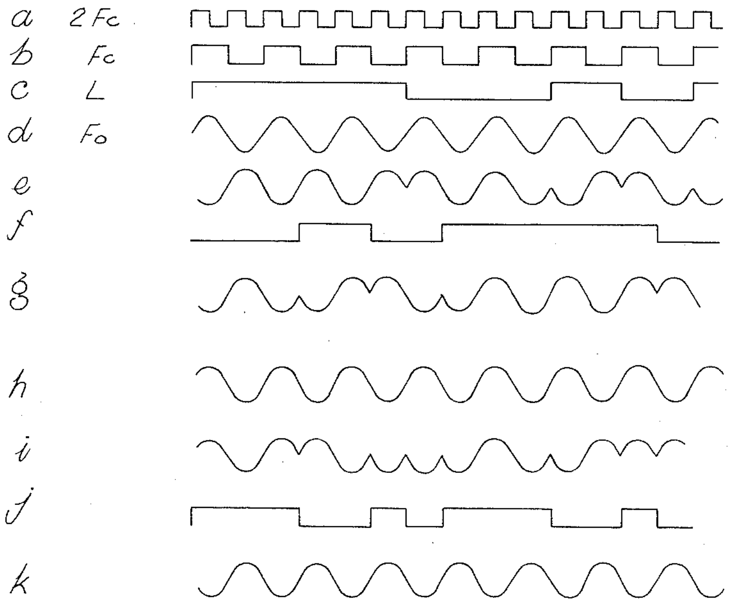
FIGS. 2($a$–$k$) depict waveforms of the signals at various points in the block diagram of FIG. 1.

Referring now to the drawings, it is shown in FIG. 1, a block diagram of the echo ranging system in accordance with the invention. A source of clock pulses 12 having a frequency $2f_c$, whose waveform is shown in FIG. 2($a$), is coupled to a divider 14 which forms an output stage having an output frequency $f_c$, whose waveform is shown in FIG. 2($b$). The output signals from the divider 14 are coupled to a pseudonoise code generator 16 having n stages. Output signals from the code generator 16 comprise a maximal length code L whose waveform is shown in FIG. 2($c$). For the code shown, $n$ is equal to 3 and the code length is 7 bits. The output from the code generator 16 is coupled to a balanced modulator 18. The modulator 18 has also coupled thereto a carrier frequency generator 22 which produces a carrier signal $f_o$, whose waveform is shown in FIG. 2($d$). The maximal length code from code generator 16 is used to bi-phase modulate the carrier signal $f_o$ in the modulator 18. The modulated output signal, whose output waveform is shown in FIG. 2($e$), out of the balanced modulator 18 has a $(\sin x/x)^2$ power distribution where each frequency line occurs at the code rate frequency $f_c$/L. The modulated output signal is then coupled through a conventional circulator 23 to an antenna 24 which transmits the signal.

For a target at range R, the round trip range from the antenna 24 to the target is 2R; and the round trip transit time is 2R/$c$ seconds where c is equal to the velocity of light.

The received signal at the antenna 24 is coupled through the circulator 23 to a mixer 26. If the round trip range to the target and back is equivalent to a one half word code period, the code itself, is transmitted in an unmodulated form, would appear at the antenna as the waveform shown in FIG. 2($f$). The actual coded echo waveform at the antenna, however, is shown in FIG. 2($g$).

It should be noted that there is a certain leakage of spillover from the modulator 18 through the circulator 23 which goes directly through the mixer 26 rather than to the antenna 24. In U.S. patent application Ser. No. 81,815, filed Oct. 19, 1970, there is described a spillover rejection system which first reconstitutes the leakage signal from the circulator, that is, removes the pseudonoise code from the carrier $f_o$ and then attenuates the carrier in a notch filter. The spillover rejection system shown as part of the block diagram configuration of FIG. 1, constitutes a variable delay network 28 into which the coded signals from the code generator 16 are coupled. Output signals from the delay 28 are then coupled to the mixer 26. The delay 28 is equal to the delay of the leakage signal delivered through the modulator 18 and the circulator 23. Thus, one input to the mixer 26 is the delayed coded signal which is coupled from the delay 28. The other inputs to the mixer 26 are coupled from the circulator 23 and comprise the coded spillover leakage signal, as well as the coded echo signal. Since the coded spillover leakage signal through the circulator 23 is in time synchronism with the coded signal through the delay 28, the output signal of the mixer will be the demodulated spillover whose waveform is shown in FIG. 2($h$), as well as the coded echo signal shown in FIG. 2($i$).

It should be noted that the coded echo signal at the mixer 26 is not reconstituted, however, since it is not in time synchronism with the coded output of the delay 28. Thus, this signal is coded a second time in the mixer 26 with the resultant waveform shown in FIG. 2($i$).

The output of the mixer 26 is coupled to a notch filter-amplifier 32 of the type described in the aforementioned patent application. The notch filter-amplifier attenuates the continuous waveform leakage carrier signal, whose waveform is shown in FIG. 2($h$), while simultaneously passing the doubly coded echo signal whose waveform is shown in FIG. 2($i$).

The doubly coded output signal from the notch filter-amplifier 32 is then coupled to a demodulator 34. The doubly coded signal of FIG. 2($i$) has the same code as the code from the generator 16, but has a coded word of period L/2$f$. Clock pulses from the clock 12 are coupled to a code generator 36. Output signals from the coded generator 36 produce a maximal length code identical to that of the coder 16, but at twice the frequency. Alternatively, of course, the coded signals from the code generator 16 could be compressed to double frequency utilizing the coded compression techniques of U.S. patent application Ser. No. 77,081, filed Oct. 1, 1970.

The coded output signals from the code generator 36 are then coupled to a delay 38 network which compensates for delays of the coded signal to the demodulator 34 via the circulator 23. The output of the delay 38, whose waveform is shown in FIG. 2(*j*), is then coupled to the demodulator 34. The demodulator 34 is thus used to demodulate the twice frequency coded signal from the notch filter-amplifier 32. The output of the demodulator 34, whose waveform is shown in FIG. 2(*k*), is then coupled to a doppler filter 42. The doppler filter 42 detects the carrier doppler which has been impressed on the echo signal due to relative movement between the target and transmitter.

Thus, as can be readily seen, the resultant resolution obtained is ½ ($c/2f$) or ($c/4f$).

What is claimed is:

1. An echo ranging system comprising:

a carrier frequency signal generator and an antenna;

a first coder for producing a first pseudonoise code;

first means for modulating said carrier frequency signal with said code;

second means for coupling said modulated carrier signal to said antenna and coupling the modulated echo signal from said antenna to a receiver leg of said system;

mixer means in said receiver leg, said modulated echo signal being coupled to said mixer means;

delay means coupling said first code to said mixer means wherein modulated leakage signal passing from said first means directly to said receiver leg through said second means is demodulated in said mixer, said mixer operating to code said echo signal a second time;

third means coupled to said mixer output for attenuating the carrier signal component from the output signal of said mixer;

fourth means for producing a second pseudonoise code identical to said first output code except at double bit rate;

and demodulation means having said twice coded echo signal and said second code coupled thereto, for demodulating said twice coded signal.

2. An echo ranging system in accordance with claim 1 including means for delaying said echo signal by a time equal to one half-word with respect to said modulated output signal, and wherein the resultant twice coded echo signal has a net code frequency equal to twice the frequency of said code generator.

3. Apparatus according to claim 2 in which said fourth means includes a clock circuit, a second coder directly responsive to said clock and a divider by two responsive to said clock to drive said first coder at a bit rate one half of the bit rate at which said second coder is driven.

4. Apparatus according to claim 1 in which said second means comprises a circulator.

5. Apparatus according to claim 1 in which said delay means delays said first code an amount equal to the delay of said leakage signals through said first and second means.

* * * * *